United States Patent [19]

Ueki

[11] Patent Number: 5,095,775
[45] Date of Patent: Mar. 17, 1992

[54] HYDRAULIC PRESSURE CONTROL SYSTEM FOR AUTOMATIC TRANSMISSION

[75] Inventor: Akihiro Ueki, Zama City, Japan

[73] Assignee: Nissan Motor Co., Ltd., Yokohama, Japan

[21] Appl. No.: 482,761

[22] Filed: Feb. 21, 1990

[30] Foreign Application Priority Data

Feb. 28, 1989 [JP] Japan .................. 1-45469

[51] Int. Cl.⁵ .................. F16H 59/14; F16H 59/68
[52] U.S. Cl. .................. 74/867; 74/568; 74/869
[58] Field of Search .................. 74/868, 869, 867

[56] References Cited

U.S. PATENT DOCUMENTS

| | | | |
|---|---|---|---|
| 3,842,693 | 10/1974 | Oberpichler | 74/868 X |
| 4,125,038 | 11/1978 | Hiramatsu | 74/869 |
| 4,188,839 | 2/1980 | Kubo et al. | 74/869 |
| 4,274,307 | 6/1981 | Iwanaga et al. | 74/868 X |
| 4,274,308 | 6/1981 | Iwanaga et al. | 74/868 X |
| 4,347,765 | 9/1982 | Leonard et al. | 74/869 |
| 4,476,747 | 10/1984 | Kanamoto | 74/868 X |
| 4,570,511 | 2/1986 | Nishimura et al. | 74/868 X |
| 4,579,020 | 4/1986 | Sugano | 74/869 |
| 4,709,597 | 1/1987 | Yasue et al. | 74/868 |
| 4,722,250 | 2/1988 | Sumiya et al. | 74/868 X |
| 4,889,016 | 12/1989 | Kuwayama et al. | 74/868 |
| 4,995,284 | 2/1991 | Takada et al. | 74/869 X |
| 5,033,330 | 7/1991 | Okahara | 74/869 X |

FOREIGN PATENT DOCUMENTS 61-165054  7/1986  Japan .

Primary Examiner—Leslie A. Braun
Assistant Examiner—Khoi Q. Ta
Attorney, Agent, or Firm—Foley & Lardner

[57] ABSTRACT

The back-pressure which is supplied to a back-pressure chamber of a servo release accumuator associated with friction elements which are engaged and disengaged, respectively during an upshift, is reduced by a solenoid controlled valve which connects the back-pressure chamber with a drain when the throttle valve of an engine associated with the transmission is sensed as being fully closed.

5 Claims, 4 Drawing Sheets

FIG. 3

|  |  | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST |  |  | ○ |  |  |  |  |  | ○ | ○ | $\dfrac{1+\alpha_1}{\alpha_1}$ | 3.22 |
|  | 2ND |  |  | ○ |  |  | ○ |  |  | ○ |  | $\dfrac{\alpha_1+\alpha_2+\alpha_1\alpha_2}{\alpha_1(1+\alpha_2)}$ | 1.69 |
|  | 3RD |  | ○ | ○ |  | ○ |  |  |  | ○ |  | 1 | 1 |
|  | 4TH |  | ○ | (○) |  |  |  | ○ |  |  |  | $\dfrac{1}{1+\alpha_2}$ | 0.69 |
|  | ENGINE BRAKING 1ST |  |  | (○) | ○ | ○ |  |  |  |  |  |  |  |
|  | 2ND |  |  | (○) | ○ | ○ | ○ |  |  |  |  |  |  |
|  | 3RD |  | ○ | (○) | ○ | ○ |  |  |  |  |  |  |  |
|  | 4TH |  | ○ | (○) | ○ |  |  | ○ |  |  |  |  |  |
| 2ND RANGE | 1ST |  |  | ○ |  |  | ○ |  |  |  | ○ |  |  |
|  | 2ND |  |  | ○ |  |  |  |  | ○ | ○ |  |  |  |
| 1ST RANGE | 1ST |  |  | ○ |  |  |  |  | ○ | ○ |  |  |  |
| REVERSE |  | ○ |  |  |  |  |  |  | ○ |  |  | $-\dfrac{1}{\alpha_2}$ | −2.22 |

( ) UNRELATED TO POWER TRANSMISSION

HYDRAULIC PRESSURE CONTROL SYSTEM FOR AUTOMATIC TRANSMISSION

BACKGROUND OF THE INVENTION

1. Field of the Invention

The present invention relates generally to automatic transmissions for use in automotive vehicles and the like, and more specifically to a load responsive engagement pressure control arrangement which reduces shift shock.

2. Description of the Prior Art

JP-A-61-165054 discloses a transmission arrangement which includes a high clutch and a band brake which are selectively engaged and disengaged respectively when a 2-3 shift valve assumes an upshift position and supplies hydraulic fluid thereto. An accumulator is connected with the hydraulic fluid chambers of the high clutch and the band brake by way of a one-way orifice arrangement; During upshifting, the one-way orifice arrangement permits the working chamber of the accumulator to charge freely in an effort to reduce shift shock and then restricts the draining of the working chamber during downshifting.

However, this arrangement has encountered the problem that when an upshift occurs with the accelerator pedal of the vehicle in a non-depressed state (viz., fully released condition), shift shock is produced.

The reason for this is that the accumulator has two back-pressure chambers, one of which is supplied with line pressure from a manual valve during all forward speeds.

In order to ensure that the required amount of torque transmitting engagement of the high clutch is produced during wide open throttle upshifts, the application of the line pressure level back-pressure on a given differential area is necessary in order to restrict the stroking of the accumulator piston. However, during upshifts wherein the accelerator pedal is fully released, the application of the line pressure level back-pressure induces the problem that the stroking of the accumulator piston is overly restricted and the amount of friction element engagement is more than required under the instant set of operating conditions.

On the other hand, if the accumulator is set so that the force produced by the back-pressure under low load is sufficiently low to avoid shift shock with the accelerator pedal fully released, the amount of engagement under high load (e.g. full open throttle) becomes inadequate. This of course leads to slippage and rapid wearing of the elements in question, and/or insufficiently rapid brake release.

SUMMARY OF THE INVENTION

It is an object of the present invention to provide a transmission control arrangement which permits the back pressure which is supplied to an upshift shift shock attenuating accumulator, to be selectively varied in response to engine torque.

In brief, the above object is achieved by an arrangement wherein the back-pressure which is supplied to a back-pressure chamber of a servo release accumuator associated with friction elements which are engaged and disengaged, resepectively during an upshift, is reduced by a solenoid controlled valve which connects the back-pressure chamber with a drain when the throttle valve of an engine associated with the transmission is sensed as being fully closed.

More specifically, a first aspect of the present invention comprises a transmission which features: a friction element having an actuation chamber; an accumulator, the accumulator having a first chamber in fluid communication with the actuation chamber and a second chamber into which a control pressure can be introduced; a shift valve; an orifice for restricting the communication between the shift valve and both the actuation chamber and the first chamber of the accumulator; and means for reducing the control pressure in the second chamber when transmission torque transmission requirement assumes a minimal level.

A second aspect of the present invention is deemed to comprise a transmission operatively connected with a prime mover which features: first and second friction elements, the first friction element being arranged to be engaged when supplied with hydraulic fluid, the second friction element having a release chamber and arranged so that when the release chamber is supplied with hydraulic fluid the second friction element is condition to assume a disengaged condition; an accumulator, the accumulator including a stepped piston which is reciprocatively disposed in a stepped bore, the piston defining a working chamber and a back-pressure chamber; a shift valve; conduit means for fluidly communicating the shift valve with the first friction element, the release chamber of the second friction element and the working chamber of the accumulator, the shift valve having a first position wherein hydraulic fluid is supplied from a source of hydraulic fluid under pressure, to the first friction element, the release chamber and the working chamber of the accumulator via the conduit means and a second position wherein the conduit means is connected to a drain; a fixed orifice disposed in the conduit means, the fixed orifice restricting communication between the shift valve, and the first friction element, the release chamber and the accumulator; a back-pressure control valve, the back-pressure control valve being disposed between the source of hydraulic fluid under pressure and the back-pressure chamber, the valve being arranged to interrupt the supply of hydraulic fluid under pressure to the back-pressure chamber and to connect the back-pressure chamber with a drain, in response to the amount of torque which is required to be transmitted through the transmission from a prime mover, assuming a predetermined low value.

A third aspect of the invention is deemed to comprise a transmission which features: a clutch, the clutch being arranged to be engaged when supplied with hydraulic fluid and to produce a third speed gear ratio when engaged; a brake, the brake having a release chamber and first and second apply chambers, the brake being arranged so that when the release chamber is supplied with hydraulic fluid the brake is conditioned to assume a disengaged position, the brake being arranged to produce a second gear when engaged and the clutch is released; a servo release accumulator, the accumulator including a piston which defines a working chamber and a back-pressure chamber therein; a 2-3 shift valve; conduit means for fluidly communicating the shift valve with the clutch, the release chamber and the working chamber of the accumulator, the shift valve having a first position wherein hydraulic fluid is supplied to the clutch, the release chamber and the working chamber via the conduit means and a second position wherein the conduit means is connected with drain; orifice means disposed in the conduit means, the orifice means being disposed between the shift valve, and the clutch, between the shift valve and the release chamber and between the shift valve and the working chamber; and means responsive to the load being applied to the transmission for varying the level of a back-pressure which is supplied into the back-pressure chamber.

A fourth aspect of the present invention is deemed to comprise a transmission which features: first and second friction elements, the first friction element being arranged to be engaged when supplied with hydraulic fluid, the second friction element having a release chamber and arranged so that when the release chamber is supplied with hydraulic fluid the second friction element is condition to assume a disengaged condition; a shift valve; conduit means for fluidly communicating the shift valve with the first friction element and the release chamber of the second friction element, the shift valve having a first position wherein hydraulic fluid is supplied to the first friction element and the release chamber via the conduit means and a second position wherein the conduit means is connected to a drain; a fixed orifice disposed in the conduit means, the fixed orifice restricting communication between the shift valve, and the first friction element and the release chamber; an accumulator, the accumulator comprising: a stepped piston reciprocatively disposed in a stepped bore, the stepped piston having a first large diameter land and a second small diameter land, the first and second lands defining first, second and third chamber in the bore, the first chamber being fluidly communicated with the conduit means, the second chamber being essentially annular in shape and communicated with a source of back-pressure, the source of back-pressure being arranged to supply hydraulic fluid under pressure when the transmission is conditioned to produce forward speed, the third chamber being supplied with hydraulic fluid under pressure when the transmission is conditioned to produce reverse gear; and means responsive to the load being applied to the transmission for varying the level of the back-pressure which is supplied into the third chamber.

A further aspect of the present invention is deemed to comprise a system including a prime mover and a transmission which is operatively connected with the prime mover for transmitting torque produced by the prime mover, the prime mover having a throttle valve for controlling the amount of torque produced by the prime mover, the transmission featuring: a first friction element, the first friction element being arranged to be engaged when supplied with hydraulic fluid; a shift valve; a first conduit leading from the shift valve to the first friction element; fixed orifice means disposed in the first conduit; a second friction element, the second friction element having a release chamber and arranged so that when the release chamber is supplied with hydraulic fluid the second friction element is condition to assume a disengaged condition; a second conduit which leads from the first conduit to the release chamber of the second friction element, the second conduit communicating with the first conduit at a location between the first friction element and the fixed orifice means; an accumulator having a working chamber and a back-pressure chamber, the back-pressure chamber being supplied with hydraulic fluid under pressure when the transmission is conditioned to produce forward speeds; a third conduit which leads from one of the first and second conduits to the working chamber the accumulator, the third conduit communicating with one of first conduit at a location between the fixed orifice means and the first friction element, and the second conduit; and means responsive to the throttle valve being opened less than a predetermined amount for reducing the pressure of the hydraulic fluid which is supplied to the back-pressure chamber.

BRIEF DESCRIPTION OF THE DRAWINGS

FIG. 3 is a chart showing the relationship between the friction element engagement and the gear ratio produced by the transmission arrangement illustrated in FIG. 2;

DETAILED DESCRIPTION OF THE PREFERRED EMBODIMENTS

Figure 2:
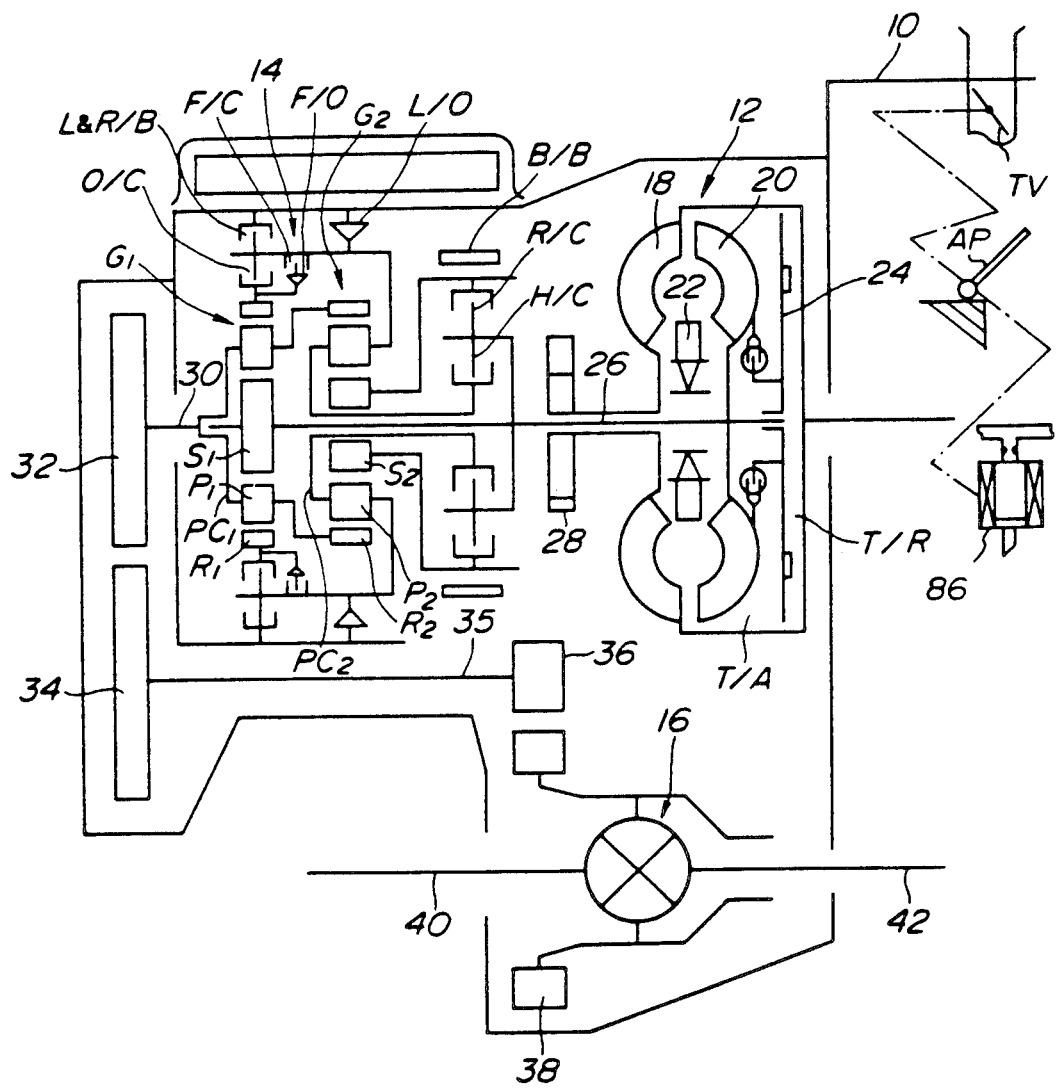
FIG. 2 is a schematic view showing a transmission gear train of the nature to which the instant invention is applied.

FIG. 2 schematically shows a transaxle to which the present invention is applied. In this arrangement the transaxle is operatively connected to engine 10 by way of a torque converter 12. The engine 10 has a throttle valve TV which is operatively connected with an accelerator pedal A/P.

A planetary gear train 14 is operatively arranged between the torque converter 12 and a differential or final drive unit 16.

The torque converter comprises a pump impeller 18, a turbine runner 20, a stator 22 and a lock-up clutch 24. The turbine runner is 20 is connected with the transmission input shaft 26. When the lock-up clutch 24 is released torque is transmitted via the pump impeller 18 to the input shaft 26. The engagement of the lock-up clutch is determined by the pressure differential existing between an apply chamber T/A and a release chamber T/R.

In this arrangement the oil pump 28 is operatively connected with the torque converter in a manner to be driven by the rotation of the pump impeller 18.

The planetary gear train 14 includes first and second planetary gear sets G1, G2. The first gear set G1 comprises sun, ring pinion gears S1, R1 and P1 while the second gear set G2 comprises sun ring and pinion gears S2, R2 and P2. The pinion gears P1 and P2 are respectively carried on pinion carriers PC1 and PC2.

The sun gear S1 of the first planetary gear set is is connected with the input shaft 26 so as to undergo synchronous rotation therewith. The pinion carrier PC1 and the ring gear R2 of the second planetary gears set G2 are connected with a transmission output shaft 30. The ring gear R1 is selectively connectable with the carrier PC2 by way of a forward one-way clutch F/O and the overrunning clutch O/C. Sun gear S2 is selectively connectable with the input shaft 26 by way of a reverse clutch R/C. The pinion carrier PC2 is arranged to connectable with the input shaft 26 by way of a high clutch H/C.

Sun gear S2 can be selectively held stationary by the application of a band brake B/B while the pinion carrier PC2 is operatively connected with parallel low one-way clutch L/O and the low and reverse brake L&R/B in manner which permits said carrier to be selectively held stationary.

An output gear 32 is fixed to one end of the output shaft 30 and arranged to mesh with an idler gear 34. The latter mentioned gear is fixed to one end of the an idler shaft 35 which extends parallel to the input shaft 26 and passes back through the transmission in the direction of the engine.

A reduction gear 36 is provide on the engine end of the idler shaft 35. This gear meshes with ring gear 38 of the differential gear 16.

Torque is delivered to the wheels of the vehicle by way of stub shafts 40, 42. In this instance the stub shafts are connected to the front wheels of the vehicle.

With the above described arrangement, selective engagement and/or use of the clutches F/C, H/C, O/C, R/C and brakes F/O & L/O, it is possible to condition the first and second planetary gear sets G1 and G2 to produce four forward speeds and one reverse. The relationship between the various engagements and the gears produced, is shown in FIG. 3.

It should be noted that, in this chart the circles denote the engagement of an element and/or the use of a one-way clutch. Bracketed circles denote elements which are engaged and/or in use, but which are not actively involved in transmitting torque.

In this transmission the band brake B/B has a second speed apply chamber 2A, a third speed release chamber 3R and a fourth speed apply chamber 4A. In FIG. 3 the smaller diameter circles denote chambers of the band brake servo which are supplied with hydraulic fluid.

Further, $\alpha 1$ and $\alpha 2$ indicate the ratios of the teeth on the ring gears R1, R2 and the corresponding sun gears S1, S2. The gear ratios which are shown are those defined by the rotational speeds of the input and output shafts 26, 30.

With the above described arrangement rotational power or torque is transferred via the gear train from the input shaft to the output shaft 30 and to the final drive or differential gear 16.

In fourth speed an overdrive condition is produced.

Figure 4:
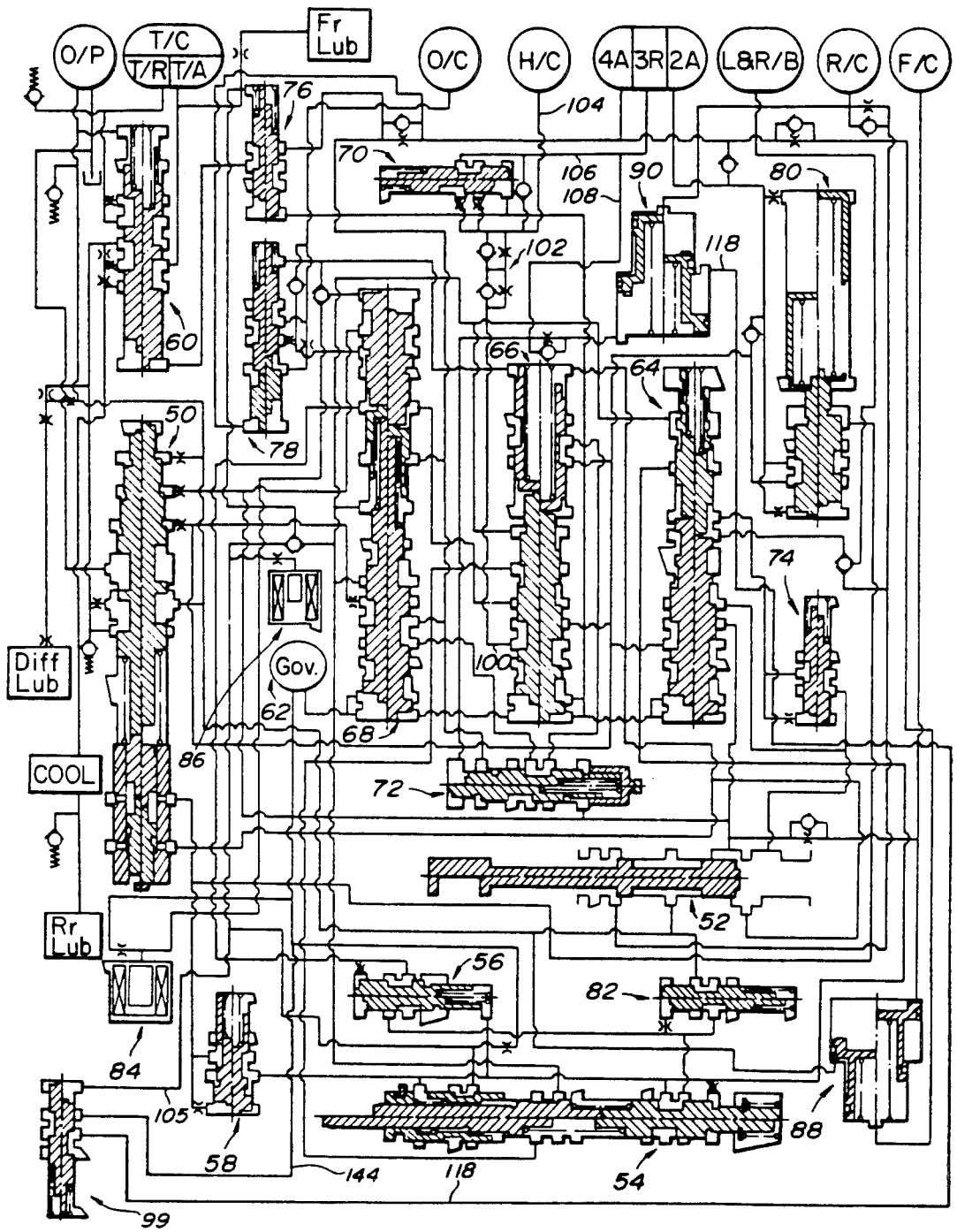
FIG. 4 is a schematic sectional view showing the incorporation of the instant invention into the hydraulic control system of the transmission shown in FIG. 2.

In order to control the above described gear train and produce the engagements shown in FIG. 3, a spool valve control system of the nature illustrated in FIG. 4 is used.

This system includes a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 shift timing valve 70, a 4-2 sequence valve 72, a fixed first speed pressure reducing valve 74, a speed cut-back valve 76, an overrunning clutch control valve 78, a 1-2 accumulator valve 80, a idle solenoid 86, a N-D accumulator 88, a servo release accumulator 90 and a back-pressure control valve 99.

The idle solenoid 86 is operatively connected with either a switch is arranged with one of the accelerator pedal or the throttle valve TV When the accelerator pedal assumes a non-depression position or when the throttle valve assumes a fully closed position, a suitable energization signal is issued to the idle valve. The reason for this will become more apparent as the disclosure proceeds.

The above listed valves are connected with the oil pump O/P, the torque converter 12, the lock-up apply and release chambers T/A, T/R, the clutches R/C, H/C, O/C & F/C, the brakes L&R/B and B/B are interconnected by a conduit arrangement in the manner illustrated in FIG. 4.

Figure 1:
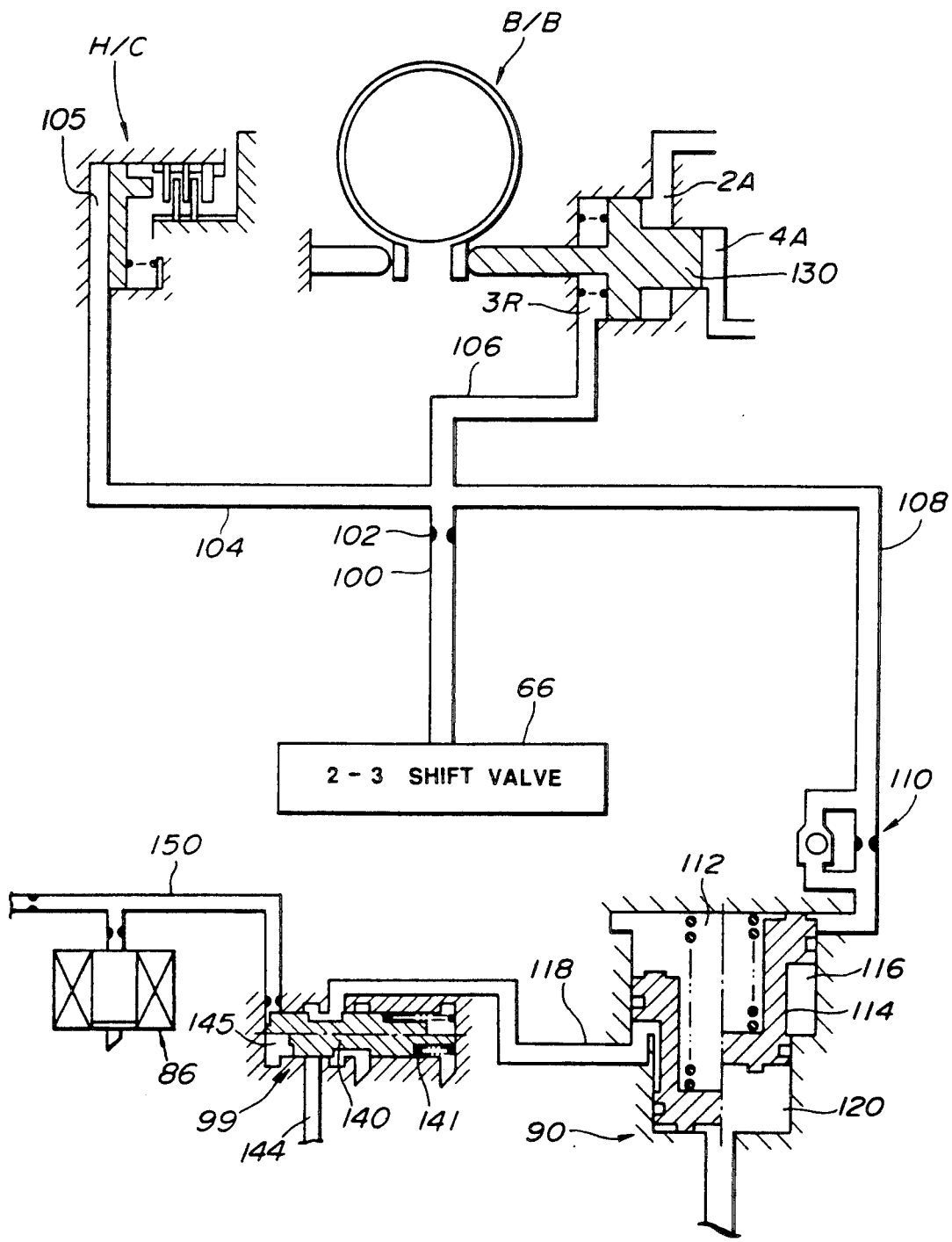
FIG. 1 is a schematic sectional view showing a hydraulic fluid circuit arrangement which illustrates the valve arrangement which characterizes the present invention.

Referring now to FIG. 1, the 2-3 shift valve 66 is arranged so that, when it assumes its upshift position, conduit 100 is disconnected from drain and connected with a source of line pressure. Under these conditions hydraulic fluid is supplied via an orifice 102 into conduits 104, 106 and 108.

In this arrangement conduit 104 communicates with the high clutch H/C, conduit 106 communicates with the third speed release chamber 3R of the band brake B/B and conduit 108 communicates with a working chamber 112 of the servo release accumulator 90.

It will be noted that in FIG. 1 the illustration of the orifice 102 is highly simplified for the sake of easy understanding and that in actual practice is defined by two one-way orifices in the manner illustrated in FIG. 4. In addition, the 3-2 timing valve 70 is in fact disposed in conduit 106, but has been omitted from the figure as it also has no direct effect on the operation of the present invention.

The servo release accumulator includes a stepped piston 114 which is reciprocatively disposed in a stepped bore (no numeral). The piston has a large diameter land and a smaller diameter one. The large diameter land separates the working chamber 112 from an essentially annular back-pressure chamber 116 which is defined by the step in the bore between the first and second lands.

A third chamber 120 is defined between one end of the bore and the smaller diameter land. This latter mentioned chamber is supplied with hydraulic fluid only when the transmission is conditioned to produce reverse gear.

A spring (no numeral) is disposed in the bore and arranged to bias the piston in a direction which increases the volume of the working chamber 112. It should be noted that the invention is by no way limited to this particular arrangement.

The back-pressure control valve 99 comprises a spool 140 which is reciprocatively disposed in a bore and which defines a control chamber 145 at one end thereof; and a spring 141 which biases the spool in a direction which tends to minimize the volume of the control chamber. When the pressure in the control chamber 145 exerts a bias which is lower than that produced by the spring 141 (viz., the chamber 145 is drained), the spool 141 assumes the position indicated by the upper half-section in the drawings. In this position communication between conduit a conduit 144 and conduit 118. As shown, conduit 118 fluidly communicates with the essentially annular back-pressure chamber 116.

As will be appreciated from FIG. 4, conduit 144 is such as to communicate the back-pressure control valve 99 with a source of line pressure. Accordingly, when control chamber 145 is drained, line pressure is supplied via conduit 114 and 118 into back-pressure chamber 116.

On the other hand, when the chamber is pressurized, the spool 140 is moved to the position shown by the lower half-section. In this second position, communication between conduits 144 and 118 is cut-off and conduit 118 is connected with drain.

A conduit 150 leads from the control chamber 145 to a source of line pressure via an un-numbered orifice. Idle valve 86 is arranged to control a drain passage which communicates with conduit 150 at a location between the just mentioned orifice and the control chamber 145. This passage also includes an orifice (no numeral). In this embodiment, the idle valve is controlled in an ON/OFF manner. When the engine throttle valve TV assumes a fully closed position, the solenoid 86 is conditioned to produce a state wherein the drain passage is closed and line pressure is permitted to develop in the control chamber.

The operation of the above embodiment is such that, when the 2-3 shift valve changes from a downshift state to an upshift one, line pressure is supplied into conduit 100. Line pressure is therefore delivered into a high clutch servo chamber 105 and the band brake third speed release chamber 3R. This induces the high clutch H/C to engage and the band brake to release. As a result the transmission is conditioned to upshift from second to third speed.

During the shifting operation, hydraulic fluid is supplied via conduit 100 orifice 102, and conduit 108 to the working chamber 112 of the accumulator 90. Under these conditions, accumulator piston 114 begins to stroke down from the position illustrated by the right hand half section toward that illustrated by the left half. As a result, the pressure prevailing downstream of the orifice 102, viz., the pressure prevailing in conduits 104, 106 and 108 and the chambers 105 and 3R, is held temporarily at a predetermined level which limits the amount o f engagement/disengagement and smooths the upshift in a manner which attenuates shiftshock.

In accordance with the instant embodiment, the level at which the line pressure is temporarily held is dependent on the opening degree of the throttle valve of the engine associated with the transmission.

When the throttle valve is open and hydraulic fluid pressure is prevented from developing in the control chamber 145 of the back-pressure control valve 90, spool 140 assumes the position illustrated by the upper section half and line pressure is supplied into chamber 116. This raises the resistance to the stroking of the piston 114 and thus raises the level at which the line pressure in conduits 104 and 106 is held.

On the other hand, if the throttle valve is detected as being fully closed, the idle solenoid is energized in a manner to close the drain and induce line pressure to develop in control chamber 145. The spool 140 is accordingly biased against the spring 141 and moves to a position wherein conduit 118 is communicated with the drain. The pressure in chamber 116 is then drained and the resistance to piston stroking is reduced.

Under these conditions, the engagement of the high clutch H/C and the disengagement of the band brake B/B is such that shift shock under this essentially no-load upshift, is attenuated.

It will be understood that although the control of the idle valve has been disclosed as being dependent on the position of the engine throttle valve, alternative parameters such as accelerator pedal position, or induction vacuum are not excluded from consideration.

The various other modification which can be made without departing from the scope of the present invention are deemed within the purview of those skilled in the art to which the instant invention pertains.

What is claimed is:
1. In a transmission
a first friction element having a first chamber;
a second friction element having a second chamber;
an accumulator, said accumulator having a working chamber in fluid communication with said first and second chambers and a back-pressure chamber into which a control pressure can be introduced;
a shift valve;
an orifice for restricting the communication between said shift valve and said first and second chambers and for restricting communication between said shift valve and the working chamber of said accumulator; and
solenoid controlled means for reducing the control pressure in said second chamber to zero when transmission torque transmission requirement assumes a minimal level.

2. In a transmission operatively connected with a prime mover:
first and second friction elements, said first friction element being arranged to be engaged when supplied with hydraulic fluid, said second friction element having a release chamber and arranged so that when said release chamber is supplied with hydraulic fluid, said second friction element is condition to assume a disengaged condition;
an accumulator, said accumulator including a stepped piston which is reciprocatively disposed in a stepped bore, said piston defining a working chamber and a back-pressure chamber;
a shift valve;
conduit means for fluidly communicating said shift valve with said first friction element, said release chamber of said second friction element and the working chamber of said accumulator said shift valve having a first position wherein hydraulic fluid is supplied from a source of hydraulic fluid under pressure, to said first friction element, said release chamber and the working chamber of said accumulator via said conduit means, said shift valve having a second position wherein said conduit means is connected to a drain;
a fixed orifice disposed in said conduit means, said fixed orifice restricting communication between said shift valve, and said first friction element, said release chamber and said accumulator; and
a solenoid controlled back-pressure control valve, said back-pressure control valve being disposed between the source of hydraulic fluid under pressure and said back-pressure chamber, said solenoid controlled back-pressure valve being arranged to interrupt the supply of hydraulic fluid under pressure to said back-pressure chamber and to connect said back-pressure chamber with a drain, in response to the amount of torque which is required to be transmitted through the transmission from a prime mover, assuming a predetermined low value.

3. In a transmission
a clutch, said clutch being arranged to be engaged when supplied with hydraulic fluid and to produce a third speed gear ratio when engaged;
a brake, said brake having a release chamber and first and second apply chambers, said brake being arranged so that when said release chamber is supplied with hydraulic fluid said brake is conditioned to assume a disengaged position, said brake being arranged to produce a second gear when engaged and said clutch is released;
a servo release accumulator, said accumulator including a piston which defines a working chamber and a back-pressure chamber therein;
a 2-3 shift valve;

conduit means for fluidly communicating said shift valve with said clutch, said release chamber and the working chamber of said accumulator, said shift valve having a first position wherein hydraulic fluid is supplied to said clutch, said release chamber and said working chamber via said conduit means and a second position wherein said conduit means is connected with a drain;

orifice means disposed in said conduit means, said orifice means being disposed between said shift valve, and said clutch, between said shift valve and said release chamber and between said shift valve and said working chamber; and solenoid controlled means responsive to the load being applied to the transmission for varying the level of a back-pressure which is supplied into said back-pressure chamber.

4. In a transmission first and second friction elements, said first friction element being arranged to be engaged when supplied with hydraulic fluid, said second friction element having a release chamber and arranged so that when said release chamber is supplied with hydraulic fluid said second friction element is condition to assume a disengaged condition;

a shift valve;

conduit means for fluidly communicating said shift valve with said first friction element and the release chamber of said said second friction element, said shift valve having a first position wherein hydraulic fluid is supplied to said first friction element and said release chamber via said conduit means and a second position wherein said conduit means is connected to a drain;

a fixed orifice disposed in said conduit means, said fixed orifice restricting communication between said shift valve, and said first friction element and said release chamber;

an accumulator, said accumulator comprising:

a stepped piston reciprocatively disposed in a stepped bore, said stepped piston having a first large diameter land and a second small diameter land, said first and second lands defining first, second and third chamber in said bore, said first chamber being fluidly communicated with said conduit means, said second chamber being essentially annular in shape and communicated with a source of back-pressure, said source of back-pressure being arranged to supply hydraulic fluid under pressure when said transmission is conditioned to produce forward speed, said third chamber being supplied with hydraulic fluid under pressure when said transmission is conditioned to produce reverse gear; and means responsive to the load being applied to the transmission for varying the level of the back-pressure which is supplied into said third chamber.

5. In a system including a prime mover and a transmission which is operatively connected with the prime mover for transmitting torque produced by said prime mover, said prime mover having a throttle valve for controlling the amount of torque produced by said prime mover a first friction element, said first friction element being arranged to be engaged when supplied with hydraulic fluid;

a shift valve;

a first conduit leading from said shift valve to said first friction element;

fixed orifice means disposed in said first conduit;

a second friction element, said second friction element having a release chamber and arranged so that when said release chamber is supplied with hydraulic fluid said second friction element is condition to assume a disengaged condition;

a second conduit which leads from said first conduit to said release chamber of said second friction element, said second conduit communicating with said first conduit at a location between said first friction element and said fixed orifice means;

an accumulator having a working chamber and a back-pressure chamber, said back-pressure chamber being supplied with hydraulic fluid under pressure when said transmission is conditioned to produce forward speeds;

a third conduit which leads from one of said first and second conduits to the working chamber of said accumulator, said third conduit communicating with one of said first or second conduits at a location between said fixed orifice means and said first friction element, and said second conduit; and means responsive to said throttle valve being opened less than a predetermined amount for reducing the pressure of the hydraulic fluid which is supplied to said back-pressure chamber.

* * * * *